United States Patent [19]

Sakamoto et al.

[11] Patent Number: 4,827,598
[45] Date of Patent: May 9, 1989

[54] AUTOMATIC ASSEMBLING METHOD AND APPARATUS FOR VEHICLE BODIES

[75] Inventors: Shunji Sakamoto; Tuyosi Watanabe, both of Higashi-Hiroshima, Japan

[73] Assignee: Mazda Motor Corporation, Hiroshima, Japan

[21] Appl. No.: 186,341

[22] Filed: Apr. 26, 1988

[30] Foreign Application Priority Data

| Apr. 28, 1987 | [JP] | Japan | 62-105219 |
| Apr. 28, 1987 | [JP] | Japan | 62-105220 |
| Apr. 28, 1987 | [JP] | Japan | 62-105221 |
| Apr. 28, 1987 | [JP] | Japan | 62-105222 |
| Apr. 30, 1987 | [JP] | Japan | 62-108478 |

[51] Int. Cl.$^4$ .............................................. B23P 11/00
[52] U.S. Cl. ........................................ 29/430; 29/469; 29/711; 29/783; 29/784; 29/793; 29/824; 198/803.2
[58] Field of Search .......... 29/429, 430, 469, 701–703, 29/711, 712, 771, 783–787, 791–795, 799, 823, 824; 198/465.1, 465.2, 465.3, 803.01, 803.2

[56] References Cited

U.S. PATENT DOCUMENTS

| 3,968,559 | 7/1976 | Karlsson | 29/430 |
| 4,658,501 | 4/1987 | Fujii et al. | 29/787 |
| 4,734,979 | 4/1988 | Sakamoto et al. | 29/822 |

FOREIGN PATENT DOCUMENTS

| 3150476 | 6/1983 | Fed. Rep. of Germany . |
| 56-103665 | 8/1981 | Japan . |
| 59-124471 | 7/1984 | Japan . |

Primary Examiner—Carl E. Hall
Assistant Examiner—Andrew E. Rawlins
Attorney, Agent, or Firm—Fleit, Jacobson, Cohn & Price

[57] ABSTRACT

An automatic assembling method and apparatus for vehicles including providing a pallet with a plurality of supporting devices for supporting under-floor parts including an engine unit, at least the supporting device for supporting the engine unit among the supporting devices being movable with respect to the pallet in a horizontal plane, and moving said movable supporting means in the horizontal plane by an operating device. In this way, the under-floor parts supported by the supporting device can be mounted on the vehicle body.

8 Claims, 12 Drawing Sheets

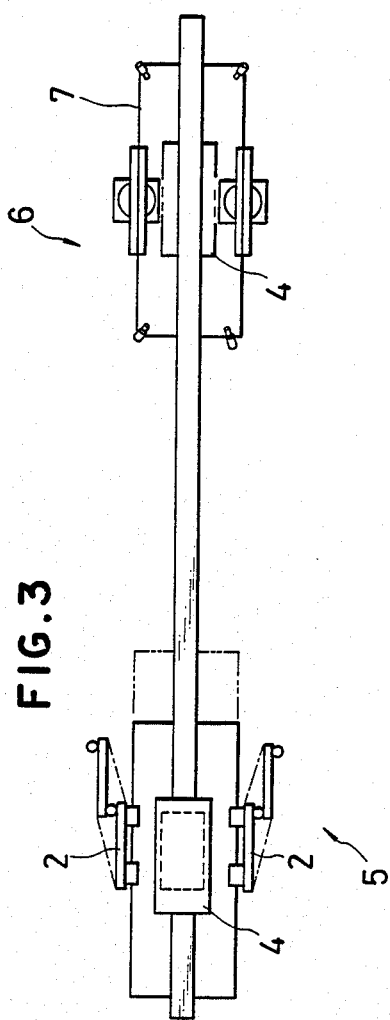
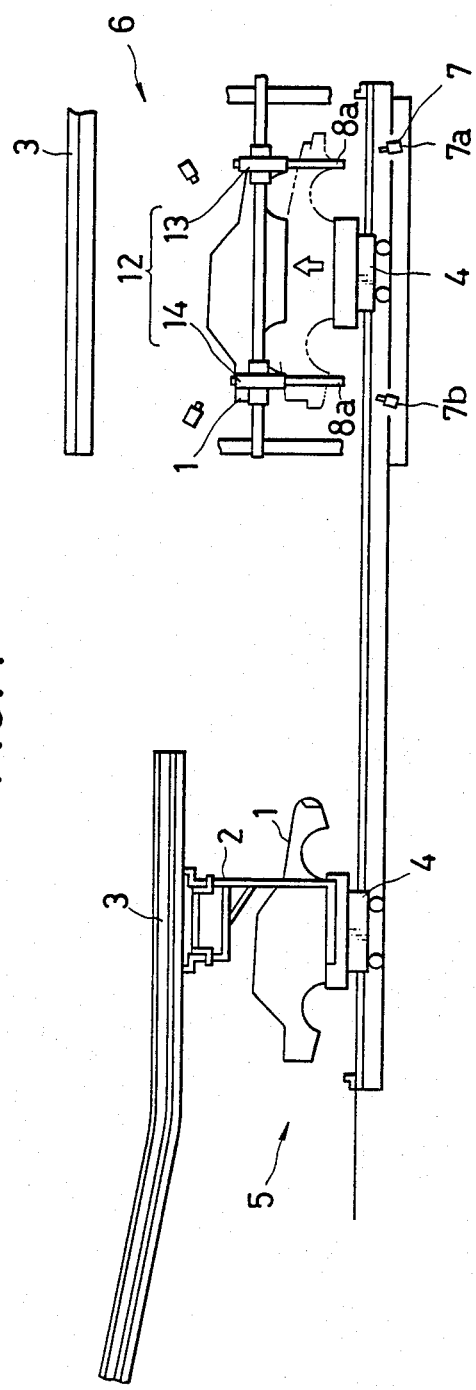
FIG.3
FIG.4

AUTOMATIC ASSEMBLING METHOD AND APPARATUS FOR VEHICLE BODIES

BACKGROUND OF THE INVENTION

The present invention relates to an automatic assembling method and apparatus for vehicle bodies and, more particularly, to such a method and an apparatus for mounting parts on a vehicle body.

DESCRIPTION OF PRIOR ART

Heretofore, in vehicle assembling processes, the vehicle body has been transported by a conveyer and parts have been mounted on the vehicle body at stations arranged along the conveyer. In particular, under-floor parts such as the engine, suspensions, fuel tank and the like, which are mounted at lower portions of the vehicle body have been installed in a vehicle body with the engine and suspensions combined with each other in a predetermined positional relationship for mounting on the vehicle body.

However, since components of the vehicle body project into the engine compartment, it is very difficult to mount the engine and the suspension on the vehicle body only by lifting them and also difficult to mount rear suspensions only by lifting them so as to face spaces encompassed by strut towers and wheel houses.

In order to overcome these difficulties, unexamined Japanese Patent Publication No. 56 (1981)-103665 proposes to mount under-floor parts on a vehicle body by setting the parts on a pallet, holding the pallet by a lifting device at a position where a vehicle body is to be stopped to have parts mounted thereon, lifting the pallet by the lifting device and mounting the parts carried by the pallets on the vehicle body when it reaches said portion. Further, unexamined Japanese Patent Publication No. 59 (1984)-124471 proposes to mount under-floor parts on a vehicle body by providing an upper table for setting the parts thereon, a lower table supported by a lifting device, an intermediate table positioned between the upper and lower tables and members for moving the upper table in a horizontal plane and positioning it, one member being positioned between the upper and intermediate tables and the other being positioned between the intermediate and lower tables, and lifting the upper table by the lifting device to mount the parts carried by the upper table on the vehicle body.

However, in the former prior art arrangement, although the pallets can be moved in the vertical direction, since no mechanism is provided for moving the pallets in a horizontal plane, it is very difficult to mount the under-floor parts carried by the pallets on the vehicle body at predetermined positions with high accuracy. Further, in the latter prior art arrangement, although the members are provided for moving the upper table in the horizontal plane, the lifting device cannot be moved in the horizontal plane. Thus, if the mechanism is adopted for a pallet holding under-floor parts, the structure of the pallet inevitably becomes complicated and the weight of the pallet increases considerably.

SUMMARY OF THE INVENTION

It is therefore one object of the present invention to provide an automatic assembling method and apparatus for vehicles capable of mounting under-floor parts on a vehicle body with a simple structure and high positional accuracy.

According to the present invention, the above and other objects can be accomplished by an automatic assembling method for vehicles comprising providing pallet means with supporting means for supporting under-floor parts including an engine unit, at least the supporting means for supporting the engine unit among said supporting means being movable with respect to said pallet means in a horizontal plane, and moving said movable supporting means in the horizontal plane by operating means. In this way, the under-floor parts supported by said supporting means can be mounted on the vehicle body. For carrying out these operations, the invention provides an automatic assembling apparatus for vehicles comprising pallet means for holding under-floor parts thereon, supporting means for supporting said under-floor parts, at least the supporting means for supporting an engine unit among said supporting means being movable with respect to said pallet means in a horizontal plane, and operating means for operating said movable supporting means in the horizontal plane.

The above and other objects and features of the present invention will become apparent from the following description made with reference to the accompanying drawings.

BRIEF DESCRIPTION OF THE DRAWINGS

FIG. 3 is a schematic drawing showing a top plan view of steps for mounting parts on a vehicle body in accordance with an embodiment of the present invention.

FIG. 4 is a schematic drawing showing a side view of steps for mounting parts on a vehicle body in accordance with an embodiment of the present invention.

DESCRIPTION OF THE PREFERRED EMBODIMENTS

Figure 1:
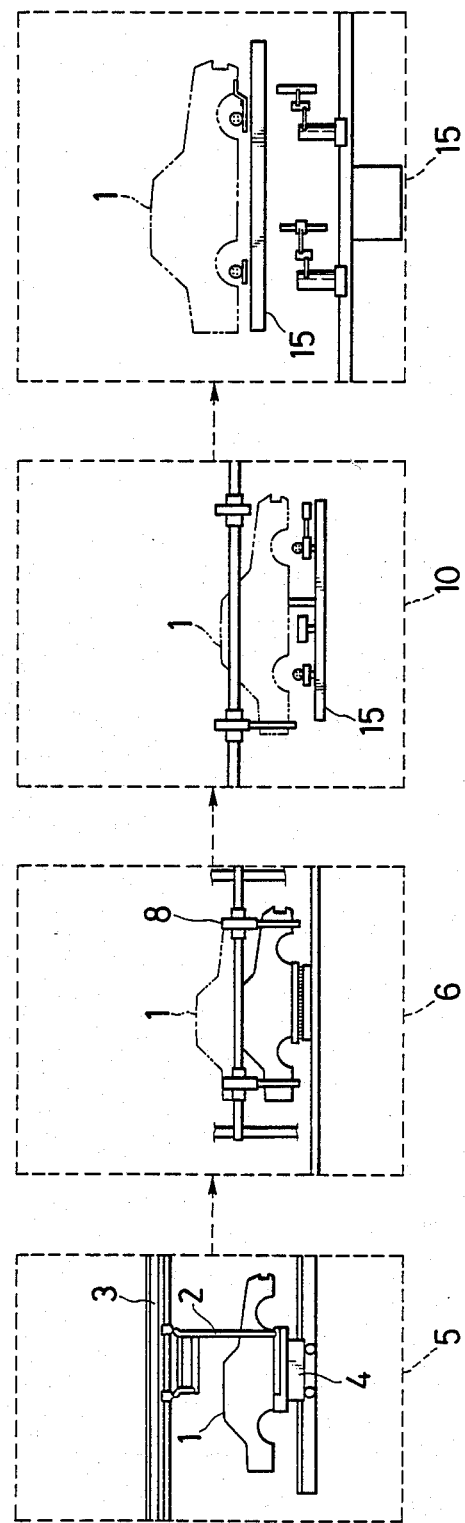
FIG. 1 is a schematic drawing showing steps for mounting parts on a vehicle body in accordance with an embodiment of the present invention.
Figure 2:
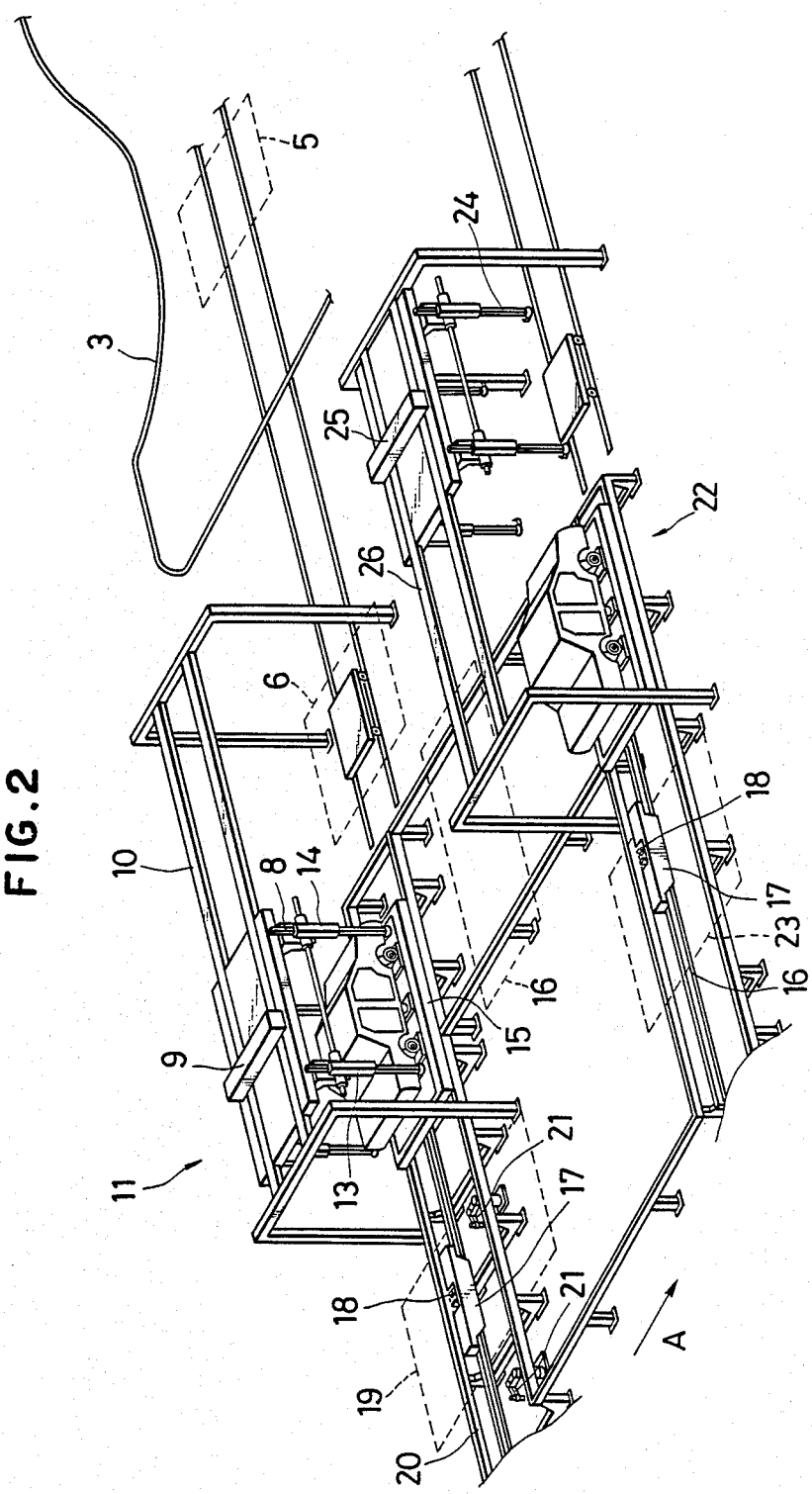
FIG. 2 is a schematic drawing showing a perspective view of steps for mounting parts on a vehicle body in accordance with an embodiment of the present invention.

Referring to FIGS. 1 to 4, there are shown steps for mounting parts on vehicle bodies. In FIGS. 1 to 4, a vehicle body 1 hung from a body hanger 2 (not shown in FIG. 2) so as to be movable along an overhead hanger rail 3 is transferred to a truck 4 at a transferring station 5 and then the vehicle body 1 on the truck 4 is transported to a positioning station 6 where the deviation in the position of the vehicle body 1 from a predetermined position is detected by a position sensing device 7 (not shown in FIGS. 1 and 2) consisting of sensors 7a and 7b shown in FIG. 4 and after its position is corrected, the vehicle body 1 is held by a body hanger 8 moved by a body hanger actuator 9 along a hanger rail 10 (not shown in FIGS. 1 and 3) at the predetermined position and the vehicle body 1 is further transported to an assembling station 11. As shown in FIG. 4, the body hanger 8 is provided with a lifting device 12 consisting of two pairs of cylinder devices 13, 14, thereby to be movable in the vertical direction. On the other hand, an engine and- other under-floor parts are set on a pallet 15 at their predetermined positions at a parts setting station 16 shown in FIG. 2 and are transported to the assembling station 11. At the assembling station 11, the under-floor parts on the pallet 15 are provisionally mounted at predetermined positions on the vehicle body 1 and then the pallet 15 holding the vehicle body 1 provisionally mounted with the under-floor parts is engaged with a pallet transporting member 17 by a hook 18 (see FIG. 2) and is transported to a mounting station 19 along a guide rail 20. At the mounting station 19, the under-floor parts are secured to the vehicle body 1 with nuts and bolts by robots 21. Further, the pallet 15 holding the vehicle body 1 with the under-floor parts is conveyed out from the mounting station 19 and is transported by a belt conveyer (not shown) in the direction of an arrow A from a first conveying line provided with the assembling station 11 and the mounting station 19 to a second conveying line provided with a separating station 22 (FIG. 2), and rear lamps are mounted on the vehicle body 1 while the vehicle body 1 is being transported by the belt conveyer. The mechanism for moving the pallet 15 from the first conveying line to the second conveying line will be described in detail later. When the pallet 15 reaches the second conveying line, it is engaged with a hook 18 of a pallet transporting member 17 and is fed to an other parts mounting station 23 where other parts such as seats, wheels and an instrument panel are mounted on the vehicle body 1 and then is conveyed to the separating station 22. At the separating station 22, the vehicle body 1 is held and lifted by a body hanger 24 which has a lifting device (not shown) similar to that of the body hanger 2 and can be moved by a body hanger actuator 25 along a hanger rail 26. As a result, the vehicle body 1 is separated from the pallet 15. Then the vehicle body 1 is conveyed out from the separating station 22 and passed from the body hanger 24 to the body hanger 2 movable along the overhead hanger rail 3 and is transported to the next step. On the other hand, the pallet transporting member 17 holding the pallet 15 thereon is transported to the parts setting station 16 where the under-floor parts for the next vehicle body 1 are set on the pallet 15, which is then transported to the assembling station 11.

Figure 5:
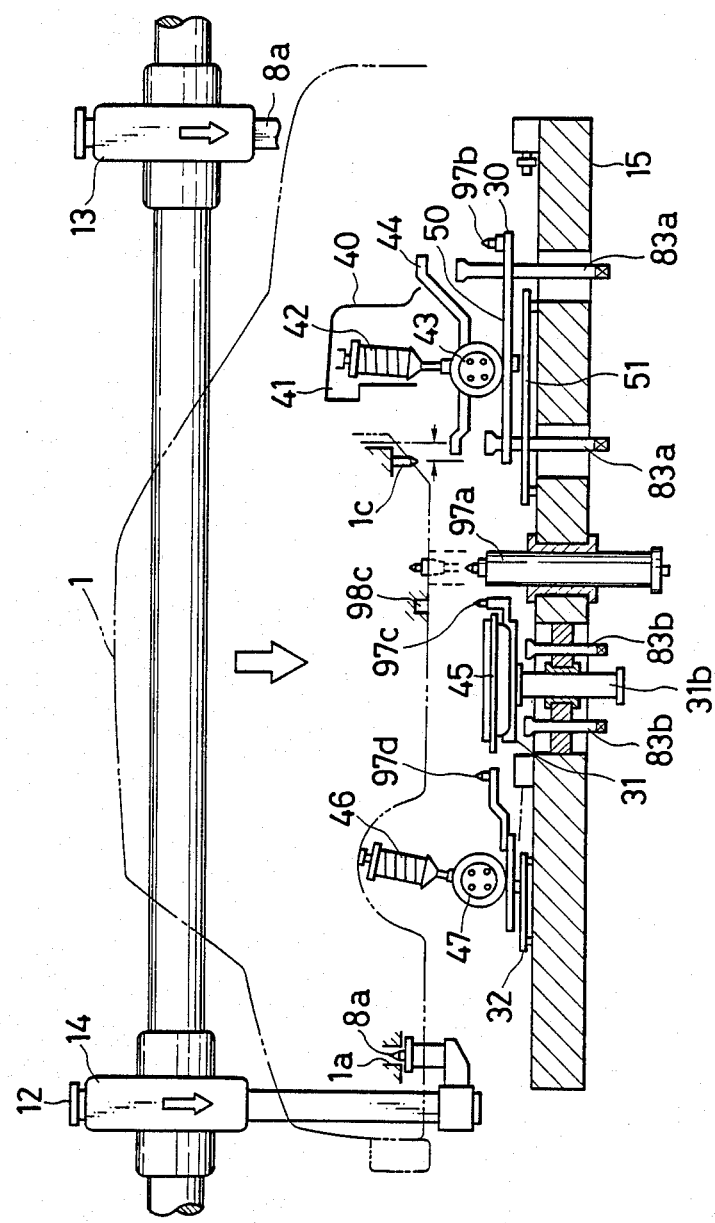
FIGS. 5 to 8 are schematic drawings showing crosssectional views of a pallet used in an automatic assembling apparatus for vehicles in accordance with an embodiment of the present invention.
Figure 6:
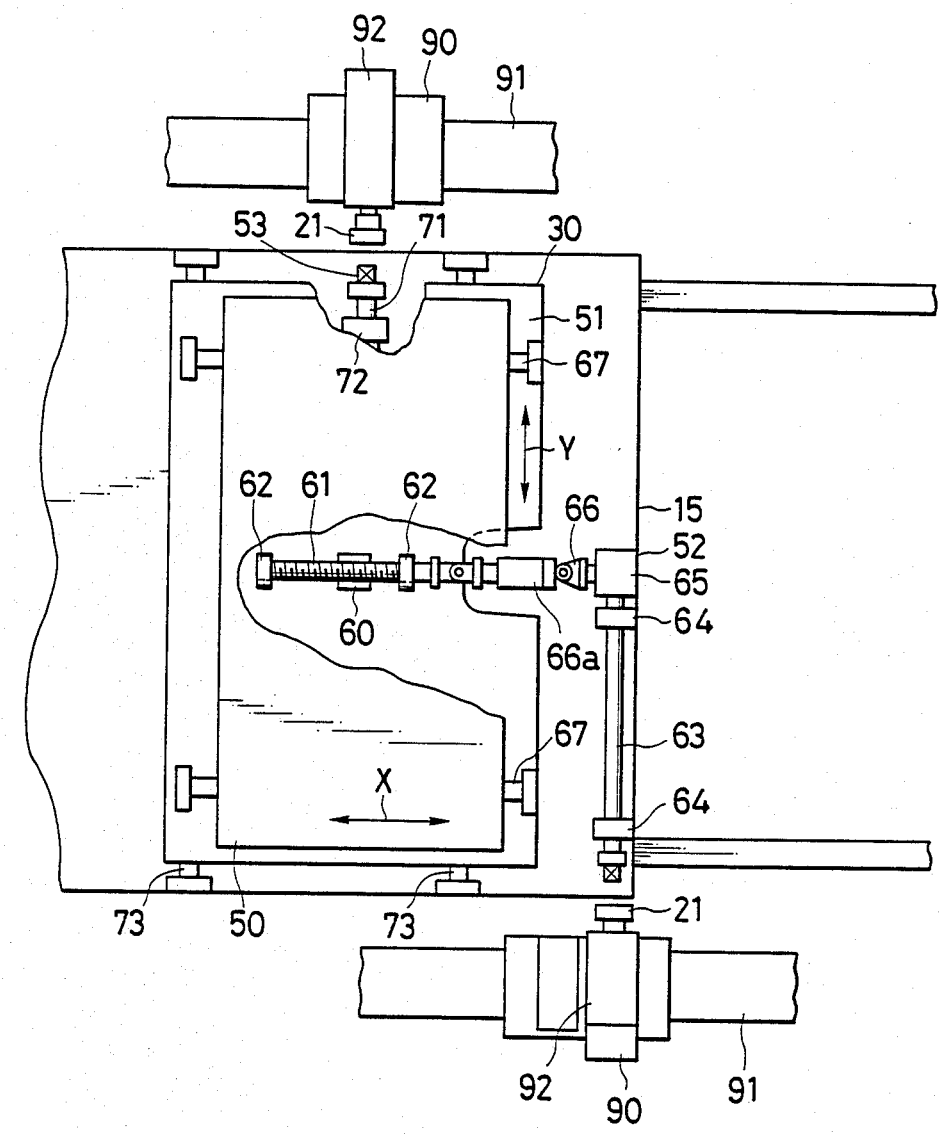
Figure 7:
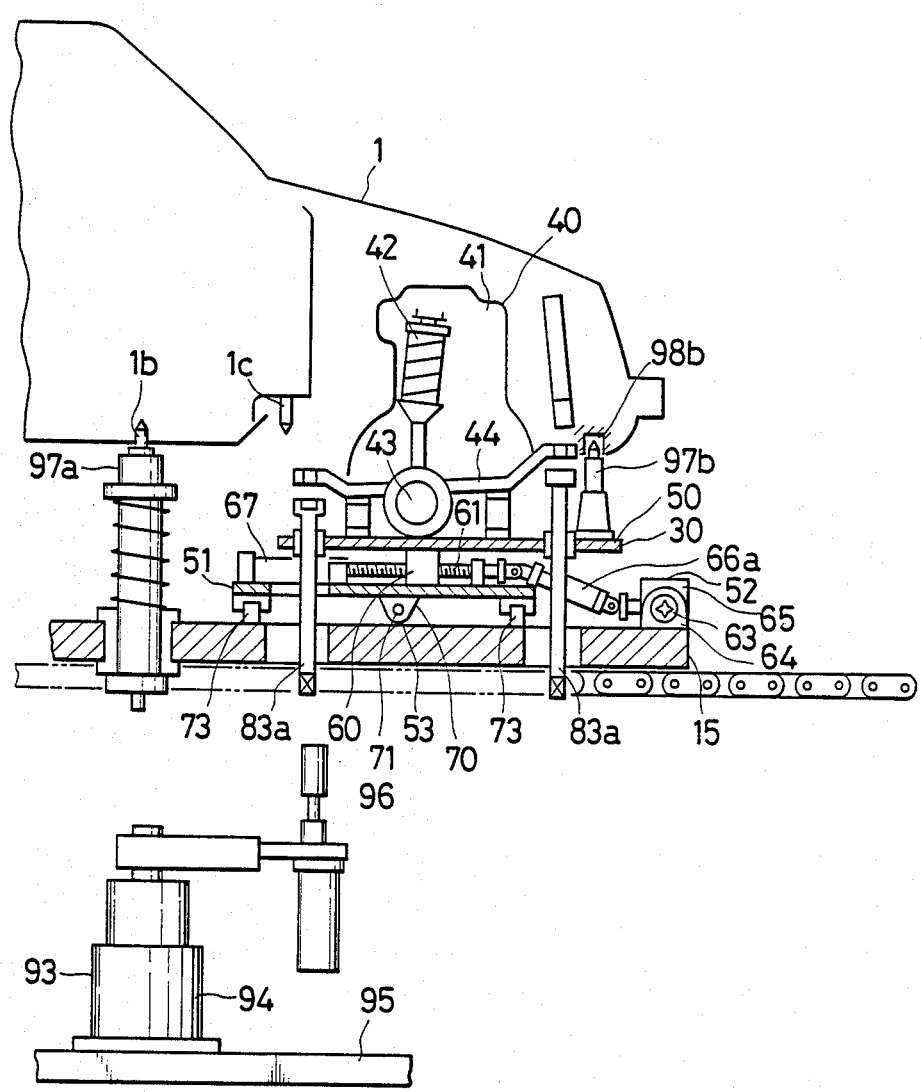
Figure 8:
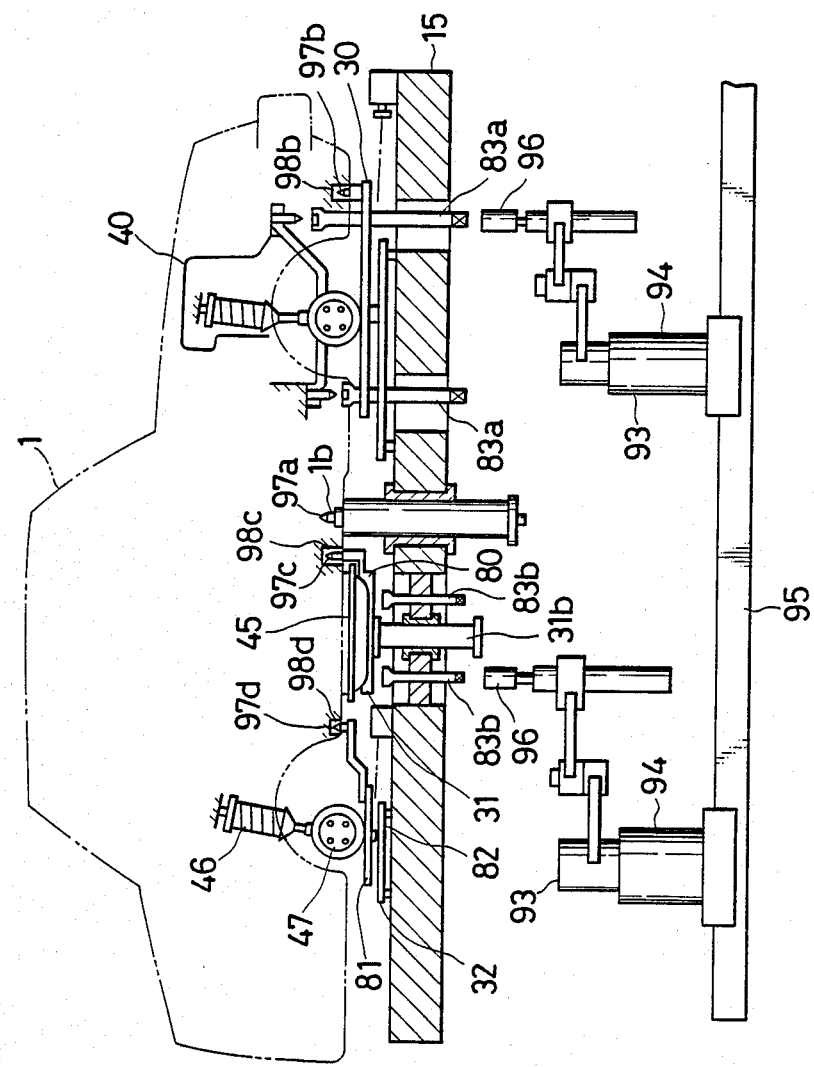

FIGS. 5 to 8 show the detailed structure of the pallet 15. FIGS. 5 and 6 show the pallet 15 at the assembling station 11 and FIGS. 7 and 8 show the pallet 15 at the mounting station 19. Referring to FIGS. 5 to 8, the pallet 15 is provided with a front parts supporting member 30 for supporting an engine unit 40 consisting of an engine 41, a front suspension 42, a front axle shaft 43 and a mount member 44, an intermediate parts supporting member 31 for supporting a fuel tank 45, and a rear parts supporting member 32 for supporting a rear suspension 46 and a rear axle shaft 47. The front parts supporting member 30 consists of an upper plate 50 and a lower plate 51. As shown in FIG. 8, the intermediate parts supporting member 31 can be moved in the vertical direction by a cylinder device 31a and is provided with an upper plate 80. The rear parts supporting member 32 is provided with an upper plate 81, a lower plate 82 and other constituents similar to those provided for the front parts supporting member 30. The upper and lower plate 50, 51 of the front parts supporting member 30, the upper plate 80 of the intermediate parts supporting member 31 and the upper and lower plate 81, 82 of the rear parts supporting member 32 can be slidably moved with respect to the pallet 15 in a horizontal plane so as to adjust the front, intermediate and rear parts supporting members 30, 31 and 33 in predetermined positions with respect to the vehicle body 1.

Further, since the engine unit 40 and the vehicle body will interfere with each other if the vehicle body 1 is lowered without any positional adjustment of the front parts supporting member 30, there are provided an upper plate moving mechanism 52 for moving the upper plate 50 in the longitudinal direction of the vehicle body 1, indicated by an arrow X in FIG. 6 and a lower plate moving mechanism 53 for moving the lower plate 51 in the lateral direction of the vehicle body 1 indicated by an arrow Y in FIG. 6. As shown in FIGS. 6 and 7, the upper plate moving mechanism 52 consists of a nut member 60 provided on the lower surface of the upper plate 50, a screw shaft 61 extending in the longitudinal direction of the vehicle body 1, engaged with the nut member 60 and rotatably supported by bearings 62, 62, and an intermediate shaft 63 rotatably supported by bearings 64, 64 provided on the pallet 15 and disposed apart from each other in the lateral direction of the vehicle body 1, the screw shaft 61 and the intermediate shaft 63 being connected to each other via a bevel gear 65 and a universal coupling 66 having a spline engaging portion 66a for absorbing the movement of the screw shaft 61. The reference numeral 67 denotes a guide rail for guiding the upper plate 50 provided on the lower plate 51.

The lower plate moving mechanism 53 consists of a nut member 70 provided on the lower surface of the lower plate 51, a screw shaft 71 extending in the lateral direction of the vehicle body 1, engaged with the nut member 70 and rotatably supported at both ends thereof (only one end shown in FIG. 6) by bearings 72, 72 provided on the pallet 15. The reference numeral 73 denotes a guide rail for the lower plate 51 secured to the pallet 15.

Further, as shown in FIGS. 7 and 8, the front parts supporting member 30 is provided with sockets 83a for turning nuts and bolts to secure the engine unit 40 to the vehicle body 1 at the mounting station 19, and the intermediate parts supporting member 31 is also provided with sockets 83b for the same purpose. The rear parts supporting member 32 may have one or more sockets, if necessary.

Moreover, as shown in FIG. 6, at the assembling station 11, there are provided two pairs of operating members 90, one pair of the operating members 90 being for operating the upper plate moving mechanism 52 and the lower plate moving mechanism 53 of the front parts supporting member 30 and the other pair being for operating those of the rear parts supporting member 32.

Each of the operating members 90 consists of a robot 21 movable along a guide rail 91 disposed at the side of the conveying path of the pallet 15 and a socket 92 held by the robot 21 which can be engaged with the upper plate moving mechanism 52 or the lower plate moving mechanism 53 in accordance with the movement of the robot 21. Such operating members 90 are also provided at the mounting station 19.

Further, as shown in FIGS. 7 and 8, at the mounting station 11 there are provided socket operating members 93 for turning the sockets 83a and 83b. Each of the socket operating members 93 consists of a robot 94 movable along a guide rail 95 disposed below the level of the conveying path of the pallet 15 and a nut-runner 96 held by the robot 94 which can be engaged with the socket 83a or 83b. Such socket operating members 93 are also provided at the assembling station 11. In this embodiment, the socket operating member 93 on the front side turns the sockets 83a and the other turns the sockets 83b.

Furthermore, the vehicle body 1 is formed with holes 1a and a hole 1b. The holes 1a are detected by the sensors 7a, 7b to position the vehicle body 1 at a predetermined position at the positioning station 6 and each of them is engaged with a lower end 8a of the rod of the body hanger 8 so that the body hanger 8 can lift the vehicle body 1. The hole 1b is used for adjusting the positional relationship between the vehicle body 1 and the pallet 15 by engaging therewith a pin member 97a provided for the pallet 15. Further, in order to adjust the positional relationship between the vehicle body and the front parts supporting member 30, the intermediate parts supporting member 31 and the rear parts supporting member 32, pin members 97b, 97c and 97d are provided for the front parts supporting member 30, the intermediate parts supporting member 31 and the rear parts supporting member 32 respectively and holes 98b, 98c and 98d engageable with the pin members 97b, 97c and 97d are provided for the vehicle body 1. In summary, the positional relationship between the vehicle body 1 and the pallet 15 is adjusted by the holes 1a and 1b and the pin member 97a as a whole and, further, the positional relationship between the vehicle body 1 and each of the parts supporting members 30, 31 and 32 is adjusted by the pin members 97b, 97c and 97d and the holes 98b, 98c and 98d. Moreover, three stud bolts 1c (only one shown in the Figures) are provided for the vehicle body 1 to mount the engine unit 40 on the vehicle body 1 and similar stud bolts (not shown) are also provided for the vehicle body 1 to mount the fuel tank 45, the rear suspension 46 and the rear axle 47.

Figure 9:
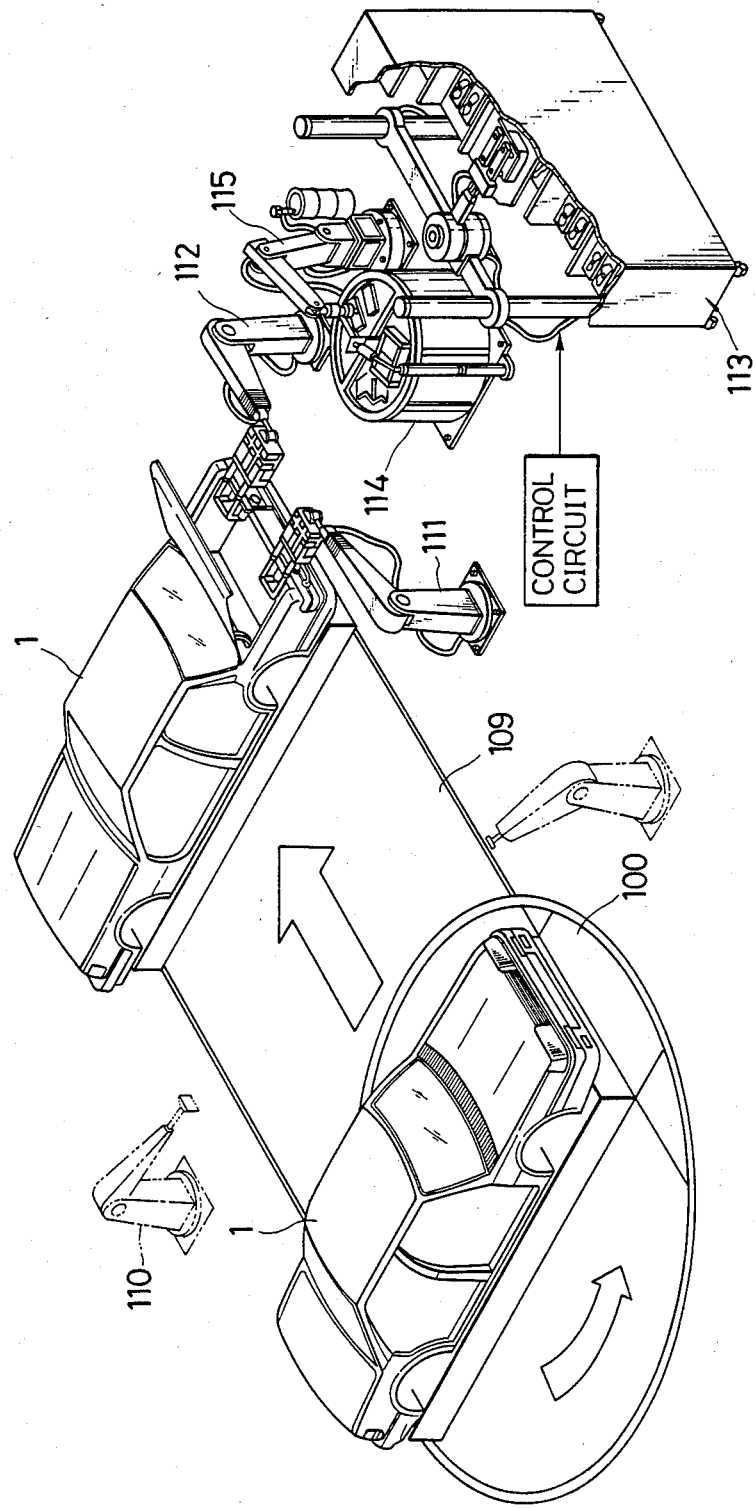
FIG. 9 is a schematic drawing showing a perspective view of a transferring conveyer portion of an automatic assembling apparatus for vehicles in accordance with an embodiment of the present invention.
Figure 10:
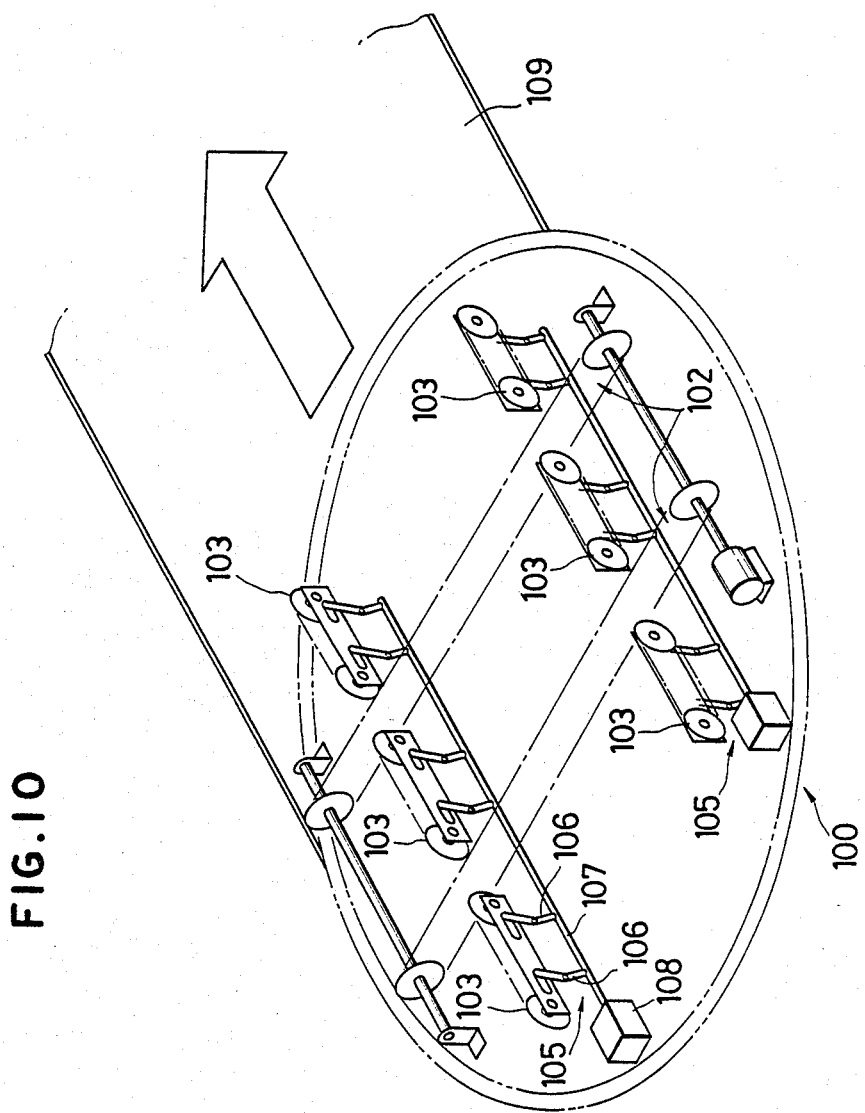
FIG. 10 is a schematic drawing showing a perspective view of a rotatable table used for transferring a pallet from one conveying line to another in an automatic assembling apparatus for vehicles in accordance with an embodiment of the present invention.
Figure 11:
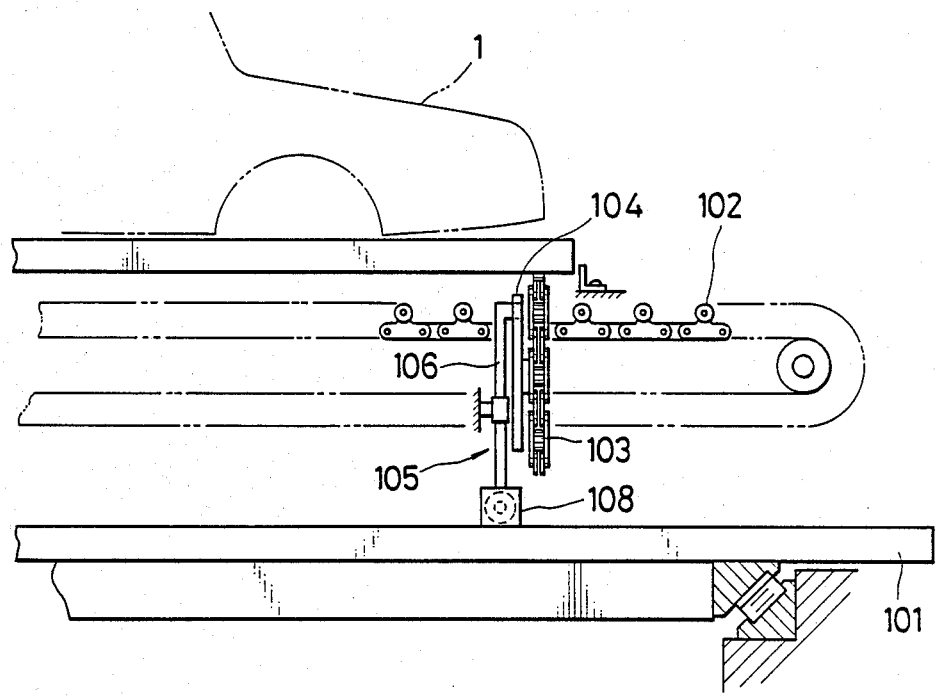
FIG. 11 is a schematic drawing showing a crosssectional view of the rotatable table shown in FIG. 10.

FIGS. 9 to 11 show a mechanism for moving the pallet 15 from the first conveying line to the second conveying line.

Referring to FIGS. 9 to 11, the pallet 15 carrying the vehicle body 1 is conveyed out from the mounting station 19 and is fed onto a rotatable table 100. The rotatable table 100 is provided with a rotatable base 101, and on the rotatable base 101 there are provided a pair of first conveyers 102 and two sets of second conveyers each consisting of three second conveyers 103. Each of the first and second conveyers 102 and 103 consists of a pair of rollers and an endless chain. The first conveyers 102 extend in the direction of the first and second conveying lines and the second conveyers extend in the direction perpendicular to the first and second conveying lines. The middle second conveyer 103 of each set is disposed between one pair of the first conveyers 102.

Each of the second conveyers 103 is supported by a support member 104 formed with an elongated hole and provided with a lifting device 105. The lifting device consists of a pair of lift arms 106, each consisting of an upper arm, a lower arm and a pin member connecting the lower end of the upper arm and the upper end of the lower arm, the movement of the pin member being restricted by a vertical elongated hole of a guide (not shown). The lower end of each of the lower arms of one set of the second conveyers 103 is connected by a connecting rod 107 which can be moved by a cylinder device 108 in the longitudinal direction thereof. The pallet 15 carrying the vehicle body 1 is conveyed onto the rotatable table 100 by the first conveyers 102. At this time, the lift arms 106 are bent into dogleg-shape so that the second conveyers 103 are positioned below the first conveyers 102, and then the rotatable table 100 rotates by 180 degrees thereby to reverse the vehicle body 1 thereon. The cylinder device 107 then pulls the connecting rods 106 to straighten them, whereby the respective second conveyers 103 are lifted higher than the first conveyers 102. Thus, the pallet 15 and the vehicle body 1 are conveyed to a transferring conveyer 109 by the second conveyers 103 and is conveyed to the second conveying line by the transferring conveyer 109.

As described above, since the vehicle body 1 is conveyed from the first conveying line to the second conveying line in the direction perpendicular to the longitudinal direction of the vehicle body 1, it is very easy to work at the front and rear portions of the vehicle body 1 by providing a robot 110 at the side of the transferring conveyer 109 as shown by a phantom line in FIG. 9.

As shown in FIG. 9, there is provided a rear lamp mounting station for mounting rear lamps on the vehicle body 1 at the end portion of the conveyer 109. At the rear lamp mounting station, a pair of robots 111 and 112 are provided for mounting right and left rear lamps on the vehicle body 1. In the vicinity of the robots 111 and 112, there are provided a shelf 113 for stocking the rear lamps, a turntable 114, a robot for picking up the rear lamps from the shelf 113 and putting them on the turntable 114 at a predetermined position and an adhesive agent coating robot 115 for applying adhesive agent on the back surface of the rear lamps on the turn table 114.

The operation of the automatic assembling apparatus for vehicles described above is as follows.

First, at the setting station 22, the engine unit 40 consisting of the engine 41, the front suspension 42, the front axle shaft 43 and the mounting member 44 are set on the front parts supporting member 30 on the pallet 15, the fuel tank 45 is set on the intermediate parts supporting member 31 on the pallet 15, and the rear suspension 46 and the rear axle shaft 47 are set on the rear parts supporting member 32 on the pallet 15. Then the pallet 15 is transported to the assembling station 11.

On the other hand, the vehicle body 1 suspended by the body hanger 2 is fed to the transferring station 5 where the vehicle body 1 is transferred from the body hanger 2 to the truck 4 and is conveyed to the positioning station 6. At the positioning station 6, the deviation in the position of the vehicle body 1 is detected by the position sensing device 7 by detecting the positions of the holes 1a with the sensors 7a, 7b, and the vehicle body 1 is lifted by the body hanger 8 by engaging the lower ends 8a of the rods of the body hanger 8 with the holes 1a, and the vehicle body 1 is conveyed to the assembling station 11 by the body hanger 8.

At the assembling station 11, the positional relationship between the vehicle body 1 and the pallet 15 is adjusted by driving the lifting device 12 so that the position of the hole 1b of the vehicle body 1 accords with that of the pin member 97a of the pallet 15. Then the front parts supporting member 30 and the rear parts supporting member 32 are moved in the horizontal plane by the operation members 90 to position the engine unit 40, the rear suspension 46 and the rear axle 47 in their respective predetermined positions, the vehicle body 1 is lowered by the lifting device 12, and the intermediate parts supporting member 31 is lifted by the cylinder device 31a, thereby to provisionally mount the under-floor parts on the vehicle body 1. When provisionally mounting the under-floor parts on the vehicle body 1, the relationship in position between each of the parts supporting member 30, 31 and 32 the vehicle body 1 is accurately adjusted by using the pin members 97b, 97c and 97d of the pallet 15 and the holes 98b, 98c and 98d of the vehicle body 1.

Then the vehicle body 1 and the pallet 15 are conveyed to the mounting station 19. At the mounting station 19, the under-floor parts on the pallet 15 are secured to the vehicle body 1 by nuts and bolts by driving the socket operating members 93 and the vehicle body 1 and the pallet 15 are transported to the rotatable table 100 where the direction of the vehicle body 1 is turned by 180 degrees and the vehicle body 1 and the pallet 15 are passed to the transferring conveyer 109. During the transferring operation of the vehicle body 1 and the pallet 15 by the transferring conveyer 109, the rear lamps are mounted on the rear portion of the vehicle body 1 by the rear lamp mounting robots 111 and 112 at the rear lamp mounting station. Then the vehicle body 1 and the pallet 15 are transferred to the second conveying line to be conveyed to the other parts mounting station 23 where other parts such as seats, wheels and an instrument panel are mounted on the vehicle body and, further, the vehicle body 1 and the pallet 15 are conveyed to the separating station 22.

At the separating station 22, the pallet 15 is separated from the vehicle body 1 and is conveyed to the setting station 16 and the same operations are repeated. On the other hand, the vehicle body 1 is transported to the next step.

According to the above described embodiment, since the upper plate 50 of the front parts supporting member 30 can be moved in both the longitudinal and lateral directions of the vehicle body 1 and the under-floor parts and the vehicle body 1 can be prevented from interfering with each other, it is easy to mount the under-floor parts on the vehicle body 1 with high accuracy, and since the weight of the pallet can be reduced and mounting of the under-floor parts on the vehicle body 1 can be completed only at the assembling station 11 and the mounting station 19, the equipment and labor costs can be markedly reduced.

Figure 12:
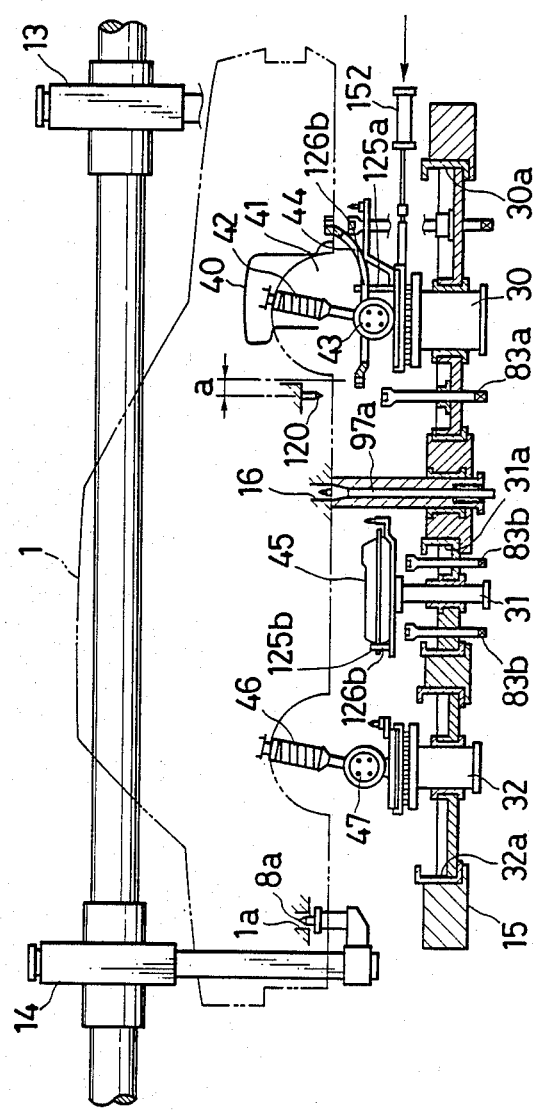
FIGS. 12 and 13 are schematic drawings showing cross-sectional views of a pallet used in an automatic assembling apparatus for vehicles in accordance with an embodiment of the present invention.
Figure 13:
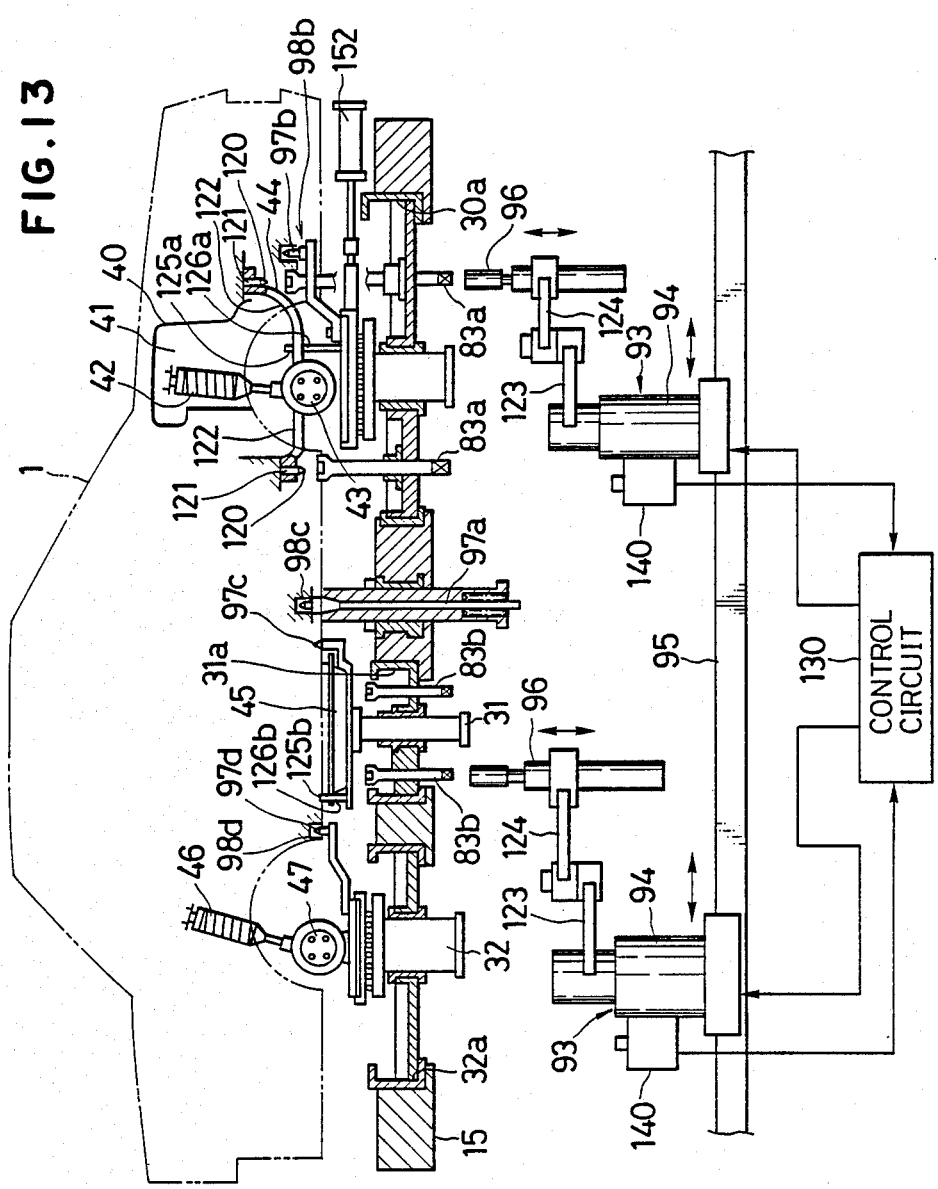

FIGS. 12 and 13 show the structure of a pallet which is used for another embodiment of the present invention. In FIGS. 12 and 13, corresponding parts are designated by the same numerals as in the previous embodiment and the descriptions of the same structures as in the previous embodiment are omitted in the following descriptions.

Referring to FIGS. 12 and 13, the pallet 15 is provided with a front parts supporting member 30 for supporting an engine unit 40, an intermediate parts supporting member 31 for supporting a fuel tank 45 and a rear parts supporting member 32 for supporting a rear suspension 46 and a rear axle shaft 47. Similarly to the previous embodiment, the upper and lower plates 50, 51 of the front parts supporting member 30, the upper plate 80 of the intermediate parts supporting member 31 and the upper and lower plate 81, 82 can be slidably moved in a horizontal plane so as to adjust the positional relationship between them and the vehicle body 1. Further, a cylinder device 152 is provided for preventing interference between the vehicle body 1 and the engine unit 40 supported by the upper plate 50 by moving the upper plate 50 of the front parts supporting device in the longitudinal direction of the vehicle body 1 by the distance "a".

In this embodiment, stud bolts 120, 120 are provided on the lower surface of the vehicle body 1 for mounting the engine unit 40 on the vehicle body 1. The stud bolts 120, 120 can be engaged with nuts (not shown) provided at the upper portions of the sockets 83a, 83a through holes 121, 121 provided in brackets 122, 122 for mounting the engine 42 thereon. The lower ends of the respective sockets 3a, 83a project below the pallet 15 and the stud bolts 120, 20 are engaged with the nuts of the sockets 83a, 83a by the front socket operating device 93a when the engine unit 40 is mounted on the vehicle body 1. The socket operating device 93 consists of the robot 94 movable along the guide rail 95 and provided with a first arm 123 swingable in a horizontal plane and the first arm 123 having a second arm 124 swingable in a horizontal plane. Further, a nut runner 96 movable in the vertical direction is provided at the end of the second arm 124. Similarly, the sockets 83b, 83b for being engaged with stud bolts (not shown) of the vehicle body 1 are provided for the intermediate parts supporting member 31 and, although not shown in FIGS. 12 and 13, sockets are provided for engagement with stud bolts of the vehicle body 1 are provided for the rear parts supporting member 32. The sockets 83b of the intermediate parts supporting member 31 and the sockets of the rear parts supporting member 32 can be engaged with the rear socket operating device 93b at the lower ends thereof. So, the lower ends of the sockets 83a engageable with the nut-runner 96 of the front socket operating device 93a are formed in the same shape and size as each other, and the lower ends of the sockets 83b of the intermediate parts supporting member 31 and the sockets engageable with the nut-runner 96 of the rear socket operating device 93b are formed in the same shape and size as each other. Further, pin members 125a and 125b are provided for the upper plates 50 and 80 of the front and intermediate parts supporting members 30 and 31 respectively and the respective pin members 125a and 125b can be engaged with holes 126a and 126b provided for the mount member 44 and the fuel tank 45 to adjust the positional relationship between the front and intermediate parts supporting members 30 and 31 and the engine unit 40 and the fuel tank 45. Similarly, although not shown in FIGS. 12 and 13, in order to adjust the positional relationship between the rear parts supporting member 32, and the rear suspension 46 and the rear axle 47, there are provided a pin member for the upper plate 81 of the rear parts supporting member 32 and a hole for a subframe for holding the rear suspension 46.

The operation of the socket operating devices 93 is controlled by a control circuit 130 consisting of, for example, a microcomputer. Since it is actually impossible to make the all pallets 15 to be used in precisely the same shape and size, it is very difficult to adjust the positions of the nut-runners 96 of the front and rear socket operating devices 96a and 96b to face the lower end surfaces of the respective sockets 83a, 83b. This embodiment solves this problem. More specifically, the memory of the control circuit 130 stores the standard shape and size of the pallet 15 and a program for controlling the operations of the socket operating device 93, especially the operations of the first arm 123 and the nut runner 96 when the pallet 15 having the standard shape and size is used. Further, at least two marks are provided on each of the pallets 15 and a photosensor 140 is provided for each of the front and rear socket operating device 93a and 93b. Thus, the deviations of the respective pallets 15 are detected by detecting the marks on the pallets 15 by the photosensor 140 and the program stored in the memory of the control circuit 130 is corrected based upon the detected deviations of the pallet 15. The socket operating device 93 is then operated in accordance with the corrected program. Accordingly, the nut runner 96 can be accurately adjusted to a position facing the lower ends of the respective sockets 83a even if the shapes and/or the sizes of the pallets 15 are different from each other and some of them become change over time. As a result, the under-floor parts can be mounted on the vehicle body 1 with high positional accuracy.

According to the above described embodiment, since the positional relationship between the vehicle body 1 and the front parts supporting member 30 is adjusted by moving the front parts supporting member 30 only in the longitudinal direction of the vehicle body 1, the pallet becomes more compact and the structure thereof becomes more simple. Further, since the position of the nut runner 125 is adjusted by the control circuit 130 in accordance with the shape and/or size of the pallet 15, it becomes possible to mount the under-floor parts on the vehicle body with high positional accuracy.

According to the present invention, it is possible with an apparatus of a simple structure to mount underfloor parts on vehicle bodies automatically and with high positional accuracy.

The present invention has thus been shown and described with reference to the specific embodiments. However, it should be noted that the present invention is in no way limited to the details of the described arrangements but changes and modifications may be made without departing from the scope of the appended claims.

For example, in the first embodiments shown in FIGS. 5 to 8, it is possible to further employ the pin members 125a, 125b of the upper plates of the respective parts supporting members 30, 31 and 32 and the holes 126a, 126b engageable with the pin members 125a, 125b. On the other hand, in the second embodiment shown in FIGS. 12 and 13, it is possible to further provide a device for moving the lower plate 51 of the front parts supporting member 30 in the lateral direction of the vehicle body 1 in addition to the cylinder device 152.

Further, in the second embodiment shown in FIGS. 12 and 13, although the deviations of each of the pallets 15 are detected by detecting the marks on the pallets by the photosensor 140, it is alternatively possible to define the shape and size deviations of each pallet 15 as those with respect to standard values, to detect those deviations in advance in terms of the length of the pallet 15 in both the longitudinal and lateral directions of the vehicle body 1 and of its rotation angle in the horizontal plane, to store these deviations in the memory of the control circuit 130, to have the control circuit 130 identify the reference number of the pallet 15 at the mounting station 19, and to read out the deviations of the pallet 15 thus specified by the identification as well as the program, and to correct the program. In this case, it is preferable to detect the deviations of the pallet 15 and replace the stored values by the newly detected values periodically, since the deviations of the pallet 15 may change over time. Further, in stead of identifying the pallet 15 by the reference number thereof, it is possible to provide a mark on each of the pallets 15 and to identify the pallet 15 by detecting the mark by a photosensor 140.

Moreover, in the above described embodiments, since it is presumed that the engine unit 40 is disposed in a front portion of the vehicle body 1, the front parts supporting member 30 is arranged to be movable in the longitudinal and lateral directions of the vehicle body 1 so as to prevent the vehicle body 1 and the engine unit 40 from interfering with each other. However, in the case where the engine unit 40 is disposed in a rear portion of the vehicle body 1, the rear parts supporting member 32 can instead be made movable in the longitudinal and lateral directions of the vehicle body 1.

Further, according to the present invention, other under-floor parts such as an exhaust system may also be mounted in addition to the engine unit 40 etc.

Furthermore, in the second embodiment shown in FIGS. 12 and 13, although the front socket operating device operates the sockets 83a of the front parts supporting member 30 and the rear socket operating device operates the sockets 83b of the intermediate parts supporting member 31 and the sockets of the rear parts supporting member 32, which socket operating member operates which sockets can be determined depending upon time consumed for the operation.

We claim:

1. An automatic assembling method for vehicles comprising providing pallet means having a horizontal plane and multiple supporting means supporting under-floor parts including an engine unit, at least first supporting means among said multiple supporting means for supporting the engine unit and being movable with respect to said pallet means in a plane parallel to the horizontal plane of the pallet means, moving said first supporting means in the plane parallel to the horizontal plane of the pallet means by operating means to position the under-floor parts, positioning a vehicle body with respect to said pallet means and lowering said vehicle body onto said pallet means and then mounting the under-floor parts supported by said supporting means onto the vehicle body.

2. An automatic assembling method in accordance with claim 1 wherein the operating means moves at least said first supporting means in synchronism with lowering said vehicle body.

3. An automatic assembling apparatus for vehicles comprising pallet means having a horizontal plane, said pallet means for holding under-floor parts thereon, multiple supporting means mounted on said pallet means, said multiple supporting means for supporting said under-floor parts, at least a first supporting means among the multiple supporting means for supporting an engine unit, at least said first supporting means being movable in a plane parallel to the horizontal plane of the pallet means, and operating means for operating at least said first supporting means in a plane parallel to the horizontal plane of the pallet means, and body positioning means for positioning a vehicle body with respect to said pallet means and lowering said vehicle body onto said pallet means into position for assembly.

4. An automatic assembling apparatus for vehicles in accordance with claim 3 wherein said operating means move said pallet means in a plane parallel to the horizontal plane of the pallet means to a position corresponding to that of said vehicle body lowered by said body positioning means.

5. An automatic assembling apparatus for vehicles in accordance with claim 3 which further includes setting means for provisionally mounting said under-floor parts on the pallet means on said vehicle body, said setting means being provided at an assembling station, conveying means for conveying said vehicle body with said under-floor parts on said pallet to a mounting station where said under-floor parts are mounted on said vehicle body, a plurality of socket means for securing said under-floor parts provisionally mounted on the vehicle body to said vehicle body, each of said socket means being provided for said pallet means and extending through said pallet means and one or more actuating means each for actuating said socket means to secure said under-floor parts to said vehicle body by being engaged with said socket means, all portions of said socket means engageable with said actuating means being formed engageable with said actuating means which said socket means are to be engaged.

6. An automatic assembling apparatus for vehicles in accordance with claim 3 which further includes setting means for provisionally mounting said under-floor parts on the pallet means on said vehicle body, said setting means being provided at an assembling station, conveying means for conveying said vehicle body with said under-floor parts on said pallet to a mounting station, mounting means for mounting said under-floor parts on said vehicle body, said mounting means being disposed at said mounting station, memory means for storing the deviations in shape and size of the respective pallet means from the standard pallet means and control means for reading out the deviations of the pallet means conveyed to the mounting station from said memory means and controlling the operation of said mounting means based upon said read-out deviations.

7. An automatic assembling apparatus for vehicles in accordance with claim 3 which further includes position adjusting means provided for said pallet means and said supporting means, thereby to adjust the positional relationship between said vehicle body and said under-floor parts.

8. An automatic assembling apparatus for vehicles in accordance with claim 3 which further includes setting means for provisionally mounting said under-floor parts on the pallet means on said vehicle body, said setting means being provided at an assembling station and conveying means for conveying out said vehicle body with said under-floor parts on said pallet from said assembling station to further stations, said conveying means comprising first conveying means for conveying said vehicle body and said pallet means in substantially the longitudinal direction of said vehicle body and second conveying means for conveying said vehicle body and said pallet means in substantially the lateral direction of said vehicle body.

* * * * *